US012530933B2

(12) United States Patent
Friese et al.

(10) Patent No.: US 12,530,933 B2
(45) Date of Patent: Jan. 20, 2026

(54) METHOD FOR DIAGNOSING A BIKE

(71) Applicant: Robert Bosch GmbH, Stuttgart (DE)

(72) Inventors: Andreas Friese, Pfalzgrafenweiler (DE); Viktor Wendel, Bad Kissingen (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 18/318,956

(22) Filed: May 17, 2023

(65) Prior Publication Data

US 2023/0410571 A1 Dec. 21, 2023

(30) Foreign Application Priority Data

May 18, 2022 (DE) ..................... 10 2022 204 945.4

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC .............................. G07C 5/0808; G07C 5/008
USPC ................................................ 701/31.6, 31.7
See application file for complete search history.

(56) References Cited

U.S. PATENT DOCUMENTS 8,720,615 B2 * 5/2014 Wanger .................... B62M 7/16 180/335
9,384,600 B2 * 7/2016 Kakinuma ........... G07C 5/0808
11,455,841 B1 * 9/2022 Brunda ................ G07C 5/0808
2009/0201315 A1 * 8/2009 Nishida .................. B60K 35/00 382/284
2012/0209470 A1 * 8/2012 Gilbert ................. G06Q 10/087 707/769
2013/0027052 A1 * 1/2013 Matsumoto .............. B62J 50/21 324/511
2014/0075356 A1 * 3/2014 Gray ...................... G07C 5/008 715/771
2014/0075362 A1 * 3/2014 Gray .................... G07C 5/0808 715/772

(Continued)

FOREIGN PATENT DOCUMENTS

DE 20 2012 102 433 U1 9/2012
DE 10 2016 200 289 A1 7/2017

(Continued)

OTHER PUBLICATIONS

Yamaha, Yamaha e-Bike Diagnostic software, Jun. 2018, published on https://www.emtbforums.com/threads/yamaha-e-bike-diagnostic-software-ver-2.23857/, pp. 1-7 (pdf).*

*Primary Examiner* — Manglesh M Patel
(74) *Attorney, Agent, or Firm* — Maginot, Moore & Beck LLP

(57) ABSTRACT

A method for diagnosing a bike, in particular an electric bike, by way of a decision tree includes (i) providing a fault notification or a symptom notification, (ii) determining a diagnostic method step for the bike based on the fault notification or the symptom notification, (iii) actuating the bike based on the diagnostic method step determined, (iv) detecting a diagnostic signal based on the actuated bike, and (v) determining a further diagnostic method step, a fault, or a fault underlying a symptom based on the diagnostic signal detected.

20 Claims, 4 Drawing Sheets

(56) References Cited

U.S. PATENT DOCUMENTS

| | | | | |
|---|---|---|---|---|
| 2014/0129077 | A1* | 5/2014 | Selkirk | G05B 23/0216 701/31.4 |
| 2014/0282256 | A1* | 9/2014 | Fish | G07C 5/008 715/835 |
| 2015/0039176 | A1* | 2/2015 | Fish | G07C 5/008 701/31.6 |
| 2016/0160780 | A1* | 6/2016 | Garrard | G07C 5/006 701/29.2 |
| 2016/0321845 | A1 | 11/2016 | Maeda et al. | |
| 2018/0190041 | A1* | 7/2018 | Hanson | G07C 5/0825 |
| 2018/0190043 | A1* | 7/2018 | Dominic | G07C 5/085 |
| 2019/0279438 | A1* | 9/2019 | Swenson | G07C 5/008 |
| 2019/0333296 | A1* | 10/2019 | Liu | G07C 5/008 |
| 2020/0017155 | A1 | 1/2020 | Hu et al. | |
| 2020/0250246 | A1 | 8/2020 | Meyer et al. | |
| 2022/0398877 | A1* | 12/2022 | Teschner | G07C 5/0808 |
| 2023/0036646 | A1* | 2/2023 | Meggiolan | B60T 17/221 |
| 2023/0376025 | A1* | 11/2023 | Nkhata | G05B 23/0272 |
| 2024/0420520 | A1* | 12/2024 | Murphy | G07C 5/008 |
| 2025/0022322 | A1* | 1/2025 | Sun | G07C 5/008 |
| 2025/0026438 | A1* | 1/2025 | Weinmann | B62M 6/45 |

FOREIGN PATENT DOCUMENTS

| | | | |
|---|---|---|---|
| DE | 10 2019 218 724 | A1 | 6/2021 |
| WO | 2020/089044 | A1 | 5/2020 |

* cited by examiner

METHOD FOR DIAGNOSING A BIKE

This application claims priority under 35 U.S.C. § 119 to application no. DE 10 2022 204 945.4, filed on May 18, 2022 in Germany, the disclosure of which is incorporated herein by reference in its entirety.

SUMMARY

The disclosure relates to a method for diagnosing a bike, in particular an electric bike, by way of a decision tree comprising the following steps:

- providing a fault notification or a symptom notification;
- determining a diagnostic method step for the bike based on the fault notification or the symptom notification;
- actuating the bike based on the diagnostic method step determined;
- detecting a diagnostic signal based on the actuated bike;
- determining a further diagnostic method step, a fault, or a fault underlying a symptom based on the diagnostic signal detected.

Advantageously, the diagnostics of the bike can be optimized by way of the method according to the disclosure.

In the context of the present application, the term "decision tree" is intended to mean in particular a multi-step decision-making process with multiple decision options. In this case, the decision tree serves to depict the decision-making rules, the decisions being made hierarchically in a sequence. The decision tree or the sequence of the decisions associated with the decision tree can in this case be static or dynamic. In the present context, the term "static decision tree" is intended to mean that the decision-making processes and the sequence of the decision-making processes remain unchanged. The term "dynamic decision tree" is in this context intended to mean that the decision-making processes and/or the sequence of the decision-making processes are adaptable, e.g., via an update of the software. The method is preferably designed as a computer-implemented method, with at least one method step or all method steps being performed by a computer. Preferably, the decision-making processes, preferably all of the decision-making processes, occur on the electric bike or on an external device, e.g. a smartphone. The external device is designed to communicate wirelessly with the electric bike, for example by way of BLE (Bluetooth Low Energy) or mobile radio.

In the context of this application, an electric bike is in particular intended to be understood as a bike comprising a drive unit for assisting the driver. The electric bike is preferably designed as an e-bike, a pedelec, a cargo bike, a folding bike, or the like. The drive unit comprises a motor, which can, e.g., be designed as a mid-drive motor or as a hub motor. The motor is preferably designed as an electric motor. The drive unit is connected to an energy storage means for supplying power to the drive unit. The power supply unit is preferably designed as a battery pack and comprises a battery housing, which is preferably releasably connected to a frame of the bike. The electric bike comprises an electronic system comprising a control unit for controlling or regulating the electric bike. The electronic system preferably comprises a sensor unit, in which case the sensor unit can comprise, e.g., motion sensors, torque sensors, speed sensors, a GNSS receiver, magnetic sensors, or the like. The electronic system further comprises a communication interface for wirelessly connecting the electric bike to an external device, e.g., a smartphone and/or a server. The electric bike can further comprise further add-on components or peripherals, such as a board computer, an in particular electronic shift control, a lighting unit for lighting the roadway and/or as a rear light, an anti-blocking system, a lock, and/or another component, or can be designed to be connectable thereto.

In the context of this application, the term "fault notification" is in particular intended to mean a fault code, a fault indicator, a fault picture, or the like, which are detected by a component and which are provided to the method for diagnosis. For example, it is conceivable that the battery pack of the electric bike will detect an excessive temperature of the battery pack and provide this information as a fault notification to the electronic system of the bike or server. The fault notification is preferably detected and/or provided by the electric bike or by an external device.

By contrast, the term "symptom notification" is in the context of this application intended to mean in particular a notification regarding a fault that is not detectable by a fault notification. The symptom notification can, e.g., be detected by a symptom-based analysis of a person who checks and assesses the present fault behavior. The symptom notification is preferably detected and/or provided by way of a user input. The user input can be made by the electric bike, e.g., an onboard computer, or using an external device.

The diagnostic signal can be detected by the electric bike, an external device, e.g. a smartphone, or a user.

It is further conceivable that the fault notification or the symptom notification be provided by a server.

It is further proposed that the actuation of the bike relate to a mechanical or electrical component. The mechanical component can, e.g., be the power unit, the electronic shift control, the anti-lock braking system, etc. For example, the electrical component can be a lighting unit. Advantageously, a functional test can be performed via the actuation.

It is also proposed that the actuation of the bike relate to a communication interface of the bike. The communication interface can be designed for short-range communication, e.g. BLE, and/or for long-range communication, e.g. mobile communications. Advantageously, a functional test can be performed by the actuation. The actuation can, e.g., occur as a test signal.

It is further proposed that the actuation of the bike and the detection of the diagnostic signal occur automatically, in particular by the bike. Advantageously, a robust diagnosis can be ensured thereby. It is likewise conceivable that this step run semiautomatically as well as a user input, e.g., for starting or evaluating the result.

It is further proposed that the diagnostic signal be detected by way of a user input. Advantageously, the diagnosis can thereby be improved.

It is further proposed that the method be fully automatic or semiautomatic, in which case the semiautomatic method only requires the symptom notification as a user input. Advantageously, a simple and efficient diagnostic method can thereby be provided.

It is further proposed that a user input prompt be provided based on the further diagnostic method step. The user prompt can be designed as a query that provides the next diagnostic method step for selection. Alternatively, it is also conceivable that, e.g., the user input prompt will prompt the user to take action on the bike, e.g., to operate a switch, a button, etc., in order to control a function, to unplug and/or plug in a component or cable, or the like.

It is further proposed that a cost parameter and/or a utility parameter be associated with the diagnostic method step, in particular with each diagnostic method step. Advantageously, an efficient diagnostic method can thereby be provided. In particular, the cost parameter corresponds to a value or an estimate that corresponds to the effort, duration, and/or costs of the diagnostic method step. In particular, the utility parameter corresponds in this case to a contribution of the associated diagnostic method step for determining the fault or the fault underlying the symptom.

It is also proposed that a sequence of the method steps be changed based on historical field data. The change is made via a computer-implemented method. Advantageously, the method can thereby be optimized.

It is further proposed that the fault tree, in particular a sequence of the determined diagnostic method steps, be optimized by way of a feedback loop. Advantageously, the method can thereby be further optimized.

It is further proposed that the fault tree, in particular the sequence of the determined diagnostic method steps, be adjusted by way of a machine learning system. In the context of this application, the term "machine learning system" is in particular intended to refer to algorithms which build a statistical model by way of training data. For example, parameters and attributes that go beyond the scope of the training data can be determined by way of the statistical model. The algorithms of the machine learning system can be algorithms for supervised learning, unsupervised learning, or reinforcement learning. For example, the machine learning system can be designed as a neural network. Training of the machine learning system preferably takes place on a server. It is further conceivable that the training of the machine learning system also take place locally on the bike or external device, and the plurality of trained machine learning systems be subsequently merged in the server.

It is further proposed that the cost parameter and/or utility parameter be adjusted based on the feedback loop or machine learning system. Advantageously, the method can thereby be optimized.

Alternatively, the disclosure relates to a method for diagnosing a bike, in particular an electric bike, comprising the following steps:

- starting a diagnostic method step;
- detecting an optical and/or acoustic signal parameter;
- signal processing of the optical and/or acoustic signal parameter;
- determining a further diagnostic method step, a fault, or a symptom based on the optical and/or acoustic signal parameter.

Advantageously, a greater number of diagnoses can be provided by way of the method.

The electric bike and/or the external device comprises at least one optical sensor element designed to detect the optical signal parameter. For example, the optical sensor element can be designed as a camera. The electric bike and/or the external device comprise(s) at least one acoustic sensor element designed to detect the acoustic signal parameter. For example, the acoustic sensor element can be designed as a microphone. The external device can be designed as a smartphone, a tablet, or a diagnostic device specifically intended for the diagnosis.

It is further proposed that the signal processing be performed by way of a pattern detection or frequency analysis. Advantageously, artifacts can be determined from the detected signal parameters by way of the signal processing. These artifacts can then be associated with a fault picture or symptom picture.

It is further proposed that a machine learning system, in particular a deep learning algorithm or neural network, be used in order to determine the further diagnostic method step, the fault, or the symptom. In particular, the determination of the artifacts and/or the association of the artifacts to a fault or symptom picture is performed by way of the machine learning system.

It is further proposed that the diagnostic method step be started by way of a user input. Alternatively, it is also conceivable that the diagnostic method step be started automatically, in particular by the bike. It is also conceivable that the diagnostic method step be started by way of a wired signal from a diagnostic device. It is also conceivable that the diagnostic method step be started by way of a wireless signal from a diagnostic device, a server, or a cloud.

BRIEF DESCRIPTION OF THE DRAWINGS

Further advantages will become apparent from the description of the drawings hereinafter. The drawings, the description, and the claims contain numerous features in combination. The skilled person will appropriately also consider the features individually and combine them to form further meaningful combinations.

Shown are.

DETAILED DESCRIPTION

Figure 1:
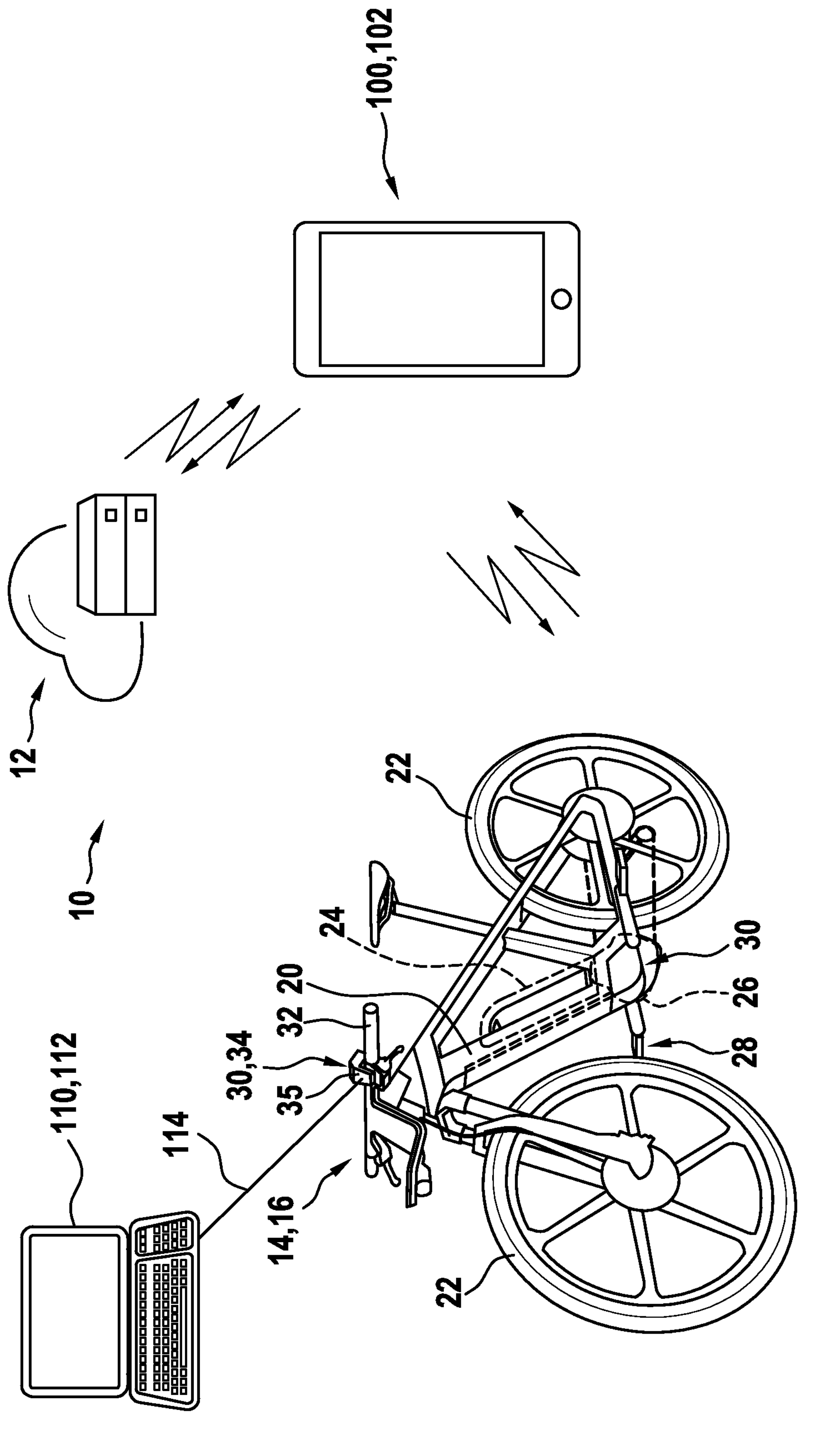
FIG. 1 a system for diagnosing a bike in a schematic view.

In FIG. 1, a system 10 for diagnosing a bike is shown in a schematic view.

The system 10 comprises a server 12, e.g., in the form of a web server, and a bike 14. The bike 14 is designed, e.g., as an electric bike 16. The electric bike 16 can be designed, e.g., as a pedelec or an e-bike.

The electric bike 16 comprises a housing in the form of a frame 20 or a bike frame. Connected to the frame 20 are two wheels 22. In addition, the electric bike 16 comprises an energy storage means 24 in the form of a battery pack. In addition, the electric bike 16 comprises a drive unit 26, which comprises an electric motor or an auxiliary motor. The electric motor is preferably designed as a permanent magnet-excited, brushless DC motor. The electric motor is designed, e.g., as a mid-drive motor, a hub motor or the like also being conceivable. The electric bike 16, in particular the drive unit 26 of the electric bike 16, is powered via the energy storage means 24. The energy storage means 24 can be externally mountable to the frame 20 or can be integrated into the frame 20.

The drive unit 26 comprises a control unit (not shown) designed to control or regulate the electric bike 16, in particular the electric motor. The electric bike 16 comprises a pedal crank 28. The pedal crank 28 comprises a pedal crankshaft (not shown). The control unit of the electric bike 16 is connected to a sensor unit (not shown). The sensor unit of the electric bike 16 comprises, e.g., multiple sensor elements, such as a torque sensor, a motion sensor, e.g., in the form of an acceleration sensor, and a magnetic sensor.

The control unit and the drive unit 26 comprising the electric motor and the pedal crankshaft are arranged within a drive housing connected to the frame 20. The drive movement of the electric motor is preferably transmitted to the pedal crankshaft via a transmission (not shown), with the magnitude of the assistance by the drive unit 26 being controlled or regulated via the control unit. The control unit is designed to drive the drive unit 26 such that the driver of the electric bike 16 is assisted in pedaling. Preferably, the control unit can be operated by the driver so that the driver can set the assistance level.

The control unit and the sensor unit are associated with the electronic system (not shown) of the electric bike 16. The electronic system comprises, e.g., a printed circuit board on which are arranged a computing unit in the form of a CPU, a memory unit, and the sensor unit. The electronic system is, e.g., arranged entirely within the drive housing of the drive unit 26. However, it is also conceivable that the electronic system be only partially arranged in the drive housing and that components of the electronic system be arranged in other areas of the electric bike 16. In addition, an arrangement of the electronic system outside the drive housing is also conceivable.

The electric bike 16 also comprises, e.g., an on-board computer 30 arranged on a handlebar 32 of the electric bike 16. The on-board computer 30 is partially releasably formed with the electric bike 16. The on-board computer 30 comprises a display unit 34 designed to display information. The on-board computer 30 also comprises an operating element (not shown) via which the user or the driver can control the on-board computer 30 and/or the electric bike 16. The control element is, e.g., designed as a touchscreen. It is also conceivable, however, that the control element of the on-board computer 30 be formed from buttons or knobs. The on-board computer 30 is connected to the control unit of the electric bike 16 such that information can be exchanged. For example, the display unit 34 can display a speed determined by the control unit, a set assistance level of the electric motor, route information of a navigation unit, and a state of charge of the energy storage means 24.

The electric bike 16 comprises a wireless communication interface. The wireless communication interface is, e.g., designed as a short-range communication interface, in particular in the form of a BLE interface. The wireless communication interface is arranged, e.g., in the on-board computer. Alternatively, other short-range communication interfaces are also conceivable. Alternatively or additionally, it is also conceivable that the electric bike 16 comprise a long-range communication interface designed to connect the electric bike 16 to a server, e.g. a web server.

The system additionally comprises an external device 100 in the form of a smartphone 102. The external device 100 comprises a wireless communication interface designed to connect the external device 100 to the electric bike 16 and to the server 12. The wireless communication interface of the external device 100 comprises, e.g., a BLE interface for connection to the electric bike 16 and an LTE interface for connection to the server 12. The electric bike 16 can thus exchange data with the server 12 via the external device 100. In the case of an electric bike 16 having a long-range communication interface, direct exchange of data between the electric bike 16 and the server 12 would also be possible.

The electric bike 16 further comprises a wired communication interface (not shown) designed to establish a wired connection between the electric bike 16 and a diagnostic device 110, e.g., in the form of a laptop 112. The wired communication interface is designed, e.g., as a USB-c interface, the diagnostic device 110 and the electric bike 16 being connectable to one another with a USB-c cable 114 for exchanging data. Alternatively, it is also conceivable to use a different USB interface or a different form of a cable connection. Alternatively, it is also conceivable that the data exchange with the diagnostic device 110 will occur via the wireless communication interface.

Figure 2:
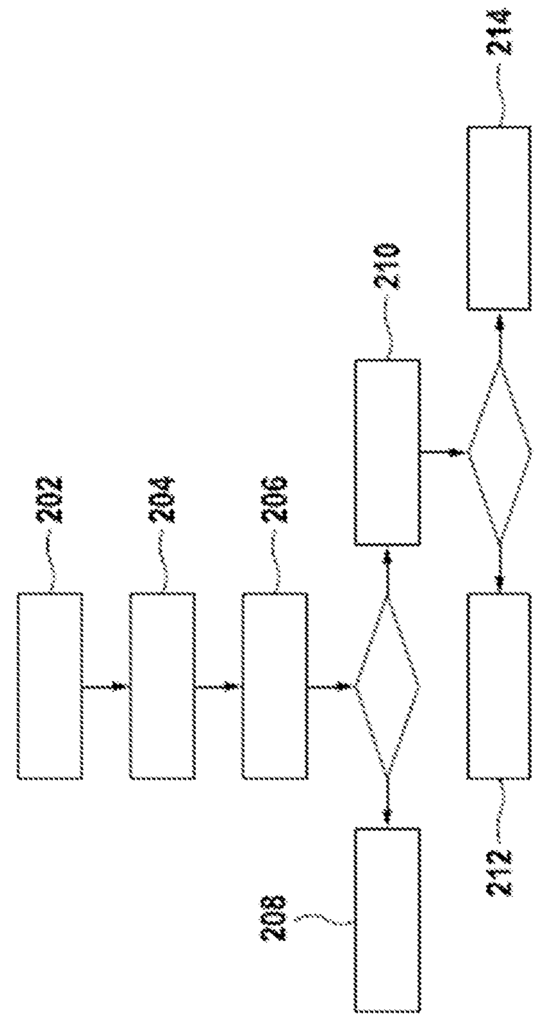
FIG. 2 a flowchart with an exemplary method for diagnosing the bike by way of a decision tree.

In FIG. 2, a flowchart shows an exemplary method for diagnosing the electric bike 16 by way of a decision tree using the diagnostic device 110.

In a first step 202, the electric bike 16 is connected to the diagnostic device 110 by way of the USB-c cable 114.

In a second step 204, a fault notification of the electric bike 16 is provided to the diagnostic device 110. The fault notification was detected, e.g., by the electric bike 16, in particular the on-board computer 30 of the electric bike 16. The fault notification is directed, e.g., at a malfunction of the energy storage means 24.

In a further step 206, a first diagnostic method step for the electric bike 16 is determined based on the fault notification, the electric bike 16 being actuated based on the first diagnostic method step. The actuation is designed, e.g., to display a user input prompt via the on-board computer 30 of the electric bike 16. The user checks the prompted symptom and enters the result via the on-board computer 30. The entry corresponds to a diagnostic signal, which in turn is provided to the diagnostic device 110.

If the symptom is present, a fault is determined in a step 208 and displayed to the user via the diagnostic device 110 or the electric bike 16.

If the symptom is not present, a further diagnostic method step is determined in a step 210 based on the diagnostic signal. To determine the diagnostic method steps, each diagnostic method step is preferably provided with a cost parameter and a utility parameter. Based on the fault notification and/or on the diagnostic signal, the further diagnostic method step which is most likely or most efficient to determine the fault is advantageously determined. By way of example, through the further determined diagnostic method step, a further actuation of the electric bike 16 is performed in the form of an actuation of the sensor unit.

The further diagnostic signal detected by the sensor unit is in turn provided to the diagnostic device 110. If the result is negative, it is indicated to the user in step 212 that there is a component failure and that the energy storage means 24 should be replaced.

If the result is positive, it will be indicated to the user in a step 214 that there is a fault of a connection cable and that it needs to be replaced.

Figure 3:
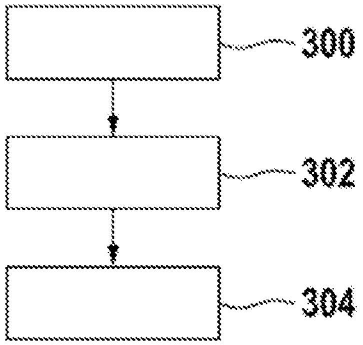
FIG. 3 a flowchart with an exemplary method for generating the decision tree.

In FIG. 3, an exemplary method for generating a decision tree, in particular for mapping cost parameters and utility parameters, is shown in a flowchart.

In a first step 300, a decision tree is provided for a fault notification or for a symptom notification based on expert knowledge. The decision tree can in this case comprise a plurality of diagnostic method steps, which are sorted in a sequence as desired or according the expert assessment.

In a second step 302, historical field data is provided by the server 12. The field data used were in this case determined via a plurality of electric bikes and provided to the server 12 via external devices. Alternatively, it is also conceivable that the data be provided to the server 12 by way of the diagnostic devices. In this case, the historical field data comprise in particular information about which diagnostic method steps and by way of which sequence of the diagnostic method steps faults were determined based on fault notifications and symptom notifications. The collection of the field data can in this case be performed by way of traditional methods like statistics with regard to the faults and causes. For example, the source of the field data can include log data, statistics of saved faults and warnings, personal feedback from observations or assessments, and information from service reports.

In a third step 304, fault tree use feedback is performed using a feedback loop so that the fault tree is continuously further developed. In this case, the feedback loop continuously adjusts and optimizes the cost parameter and/or the utility parameter of the individual diagnostic method steps. By way of example, the feedback is in this case designed as a binary response, the response being directed at the question of whether or not the correct cause or the fault was determined after running the proposed or utilized decision tree. In particular, by adjusting the cost parameter and the utility parameter, the probability that a diagnostic method step is offered as a meaningful option in the decision tree is increased when it has previously helped with the troubleshooting and reduced when the diagnostic method step has not contributed to the solution.

The decision tree is in this case adjusted such that the correct fault is determined with minimal effort based on the fault notification or the symptom notification.

The effort is in this case defined, e.g., as a weighted sum of the efforts of the individual diagnostic method steps. The cost of a diagnostic method step, in turn, is defined as the sum of its costs. These costs consist of i elements. These include, e.g.,: time, monetary costs, complexity, and possible other factors. The costs are normalized to a range of values [0,1], in which case 0 corresponds to no costs and 1 corresponds to maximum costs. These costs $c_i$ can then be weighted against one another by way of a weighting $w_i$:

$$\text{Cost parameter (diagnostic method step } m)=\Sigma_{i=1}^{n} w_i * c_i$$

The utility of a diagnostic method step m is defined as the progress to the exact diagnosis after application of the diagnostic method step proceeding from the state prior to the diagnostic method step. This value is also standardized, e.g., between [0; 1], in which case 0 means "no improvement" and 1 means "cause is now precisely determined".

$$\text{Utility parameter } N \in [0,1]$$

This value N is also then weighted ($w_N$), so that it is possible to weight costs and benefits against one another.

$$\text{Cost-benefit ratio (diagnostic measure } m)=w_N * N - \Sigma_{i=1}^{n} w_i * c_i$$

The cost of a single diagnostic method step is defined as the sum of the costs necessary for performing this diagnostic method step. The time taken to perform the diagnostic method step is initially considered as costs, but also the complexity and need for further tools. This corresponds to the optimal path for proper diagnosis.

Ideally, a sequence of diagnostic method steps is then proposed in which the diagnostic method steps with the lowest costs (simple and quick to perform) provide the best information about the cause of the fault. Using the method described herein, the user should be able to identify the present fault or the cause of the fault as quickly and easily as possible with the highest possible accuracy.

Figure 4:
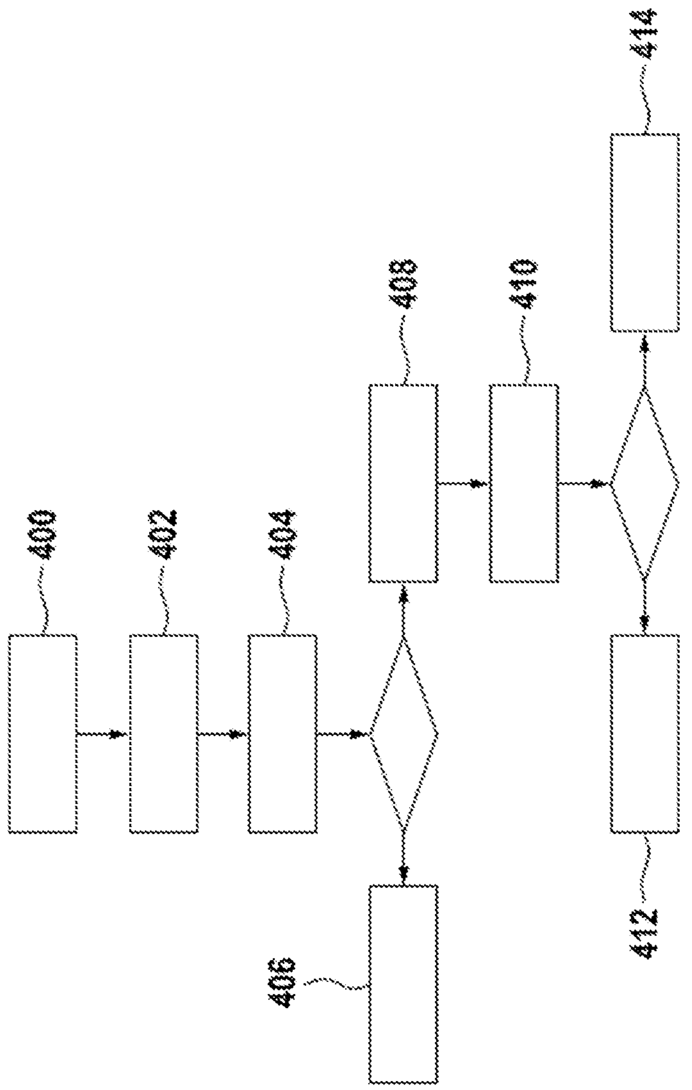
FIG. 4 a flowchart showing a further exemplary method for diagnosing the bike by way of a decision tree.

In FIG. 4, a flowchart shows a further exemplary method for diagnosing the electric bike 16 by way of a decision tree. The diagnostics are in this case performed, e.g., in part on the external device 100.

In a first step 400, the symptom notification is provided to the external device 100. The symptom notification is in this case detected, e.g., via a user input of the driver. The symptom notification in this case in the form of a reduced output of the drive unit 26 of the electric bike 16.

In step 402, a first diagnostic method step is started based on the symptom notification. For this purpose, an optical signal parameter is detected by the external device 100, in particular a camera (not shown) of the external device 100. The optical signal parameter is, e.g., an image of a drive unit. The image is made, e.g., by the user and under the direction of the external device.

The optical signal parameter is then processed in step 404. The signal processing comprises, e.g., pattern detection, in which it is determined whether there is visible damage to the drive unit.

If there is visible damage, a replacement of the component is proposed in step 406.

If there is no visible damage, a further diagnostic method step is started in step 408. The user is prompted by way of the on-board computer 30 of the electric bike 16 or the external device 100 to ride the electric bike 16 and the activated drive unit 26. During travel, an acoustic signal parameter is detected by a microphone (not shown) of the external device 100.

In a further step 410, a further signal processing is performed, the acoustic signal parameter being a frequency analysis. The frequency analysis is performed, e.g., by way of a machine learning system, preferably a deep learning algorithm.

If no fault can be determined by way of the frequency analysis, the replacement of the component or the drive unit 26 is proposed, e.g., in step 412.

If the fault can be determined by the frequency analysis, then the fault is displayed to the user via the on-board computer 30 or the external device 100 in step 414. Preferably, a precise determination of the fault, e.g., a defective electric motor, a worn transmission, or a damaged crankshaft, can be determined and indicated by the frequency analysis.

What is claimed is:

1. A method for diagnosing a bike by way of a decision tree using a system including a diagnostic device and an external device operably connected to the diagnostic device, the method comprising:

providing a symptom notification from the external device to the diagnostic device, the symptom notification including an image of a portion of the bike, and the diagnostic device operably connected to the bike;

determining a diagnostic method step for the bike based on the provided symptom notification using the diagnostic device;

actuating the bike based on the diagnostic method step determined;

detecting a diagnostic signal based on the actuated bike using the diagnostic device; and determining a further diagnostic method step, a fault, or a fault underlying a symptom based on the diagnostic signal detected, wherein the determined further diagnostic method step includes detecting an acoustical signal during operation of the bike using a microphone of the external device.

2. The method according to claim 1, wherein the image is generated by a camera of the external device.

3. The method according to claim 1, wherein a further symptom notification is provided by a server of the system, the server operably connected to the diagnostic device.

4. The method according to claim 1, wherein the diagnostic device is configured to actuate the bike by sending corresponding signals to a communication interface of the bike.

5. The method according to claim 1, wherein the actuation of the bike and the detection of the diagnostic signal occur automatically.

6. The method according to claim 1, wherein the diagnostic signal is detected by way of a user input.

7. The method according to claim 1, wherein:

the method is fully automatic or semiautomatic, and the semiautomatic method only requires the symptom notification as a user input.

8. The method according to claim 1, wherein a user input prompt is made based on the further diagnostic method step.

9. The method according to claim 1, wherein a cost parameter and/or a utility parameter is associated with the diagnostic method step.

10. The method according to claim 1, wherein a sequence of the method steps is changed based on historical field data.

11. The method according to claim 9, wherein a sequence of the diagnostic method steps determined is optimized by way of a feedback loop.

12. The method according to claim 1, wherein a sequence of the diagnostic method steps determined is adjusted by way of a machine learning system.

13. The method according to claim 11, wherein the cost parameter and/or the utility parameter is adjusted based on the feedback loop.

14. The method according to claim 1, wherein the bike is an electric bike.

15. The method according to claim 1, wherein the actuation of the bike and the detection of the diagnostic signal occur automatically by the bike.

16. The method according to claim 1, wherein a cost parameter and/or a utility parameter is associated with each diagnostic method step.

17. The method according to claim 1, wherein the fault tree is optimized by way of a feedback loop.

18. The method according to claim 1, wherein the fault tree is adjusted by way of a machine learning system.

19. The method according to claim 1, further comprising:

processing the image to identify visible damage to a drive unit of the bike using the diagnostic device; and proposing a replacement of the drive unit when the visible damage is identified using the diagnostic device.

20. A method for diagnosing a bike by way of a decision tree using a system including a diagnostic device and an external device operably connected to the diagnostic device, the method comprising:

providing a symptom notification from the external device to the diagnostic device, the symptom notification including an image of a portion of the bike, and the diagnostic device operably connected to the bike;

determining a diagnostic method step for the bike based on the provided symptom notification using the diagnostic device;

actuating the bike based on the diagnostic method step determined;

detecting a diagnostic signal based on the actuated bike using the diagnostic device; and determining a further diagnostic method step or a fault underlying a symptom based on the detected diagnostic signal, wherein the determined further diagnostic method step includes detecting an acoustical signal during operation of the bike using a microphone of the external device.

* * * * *